United States Patent
Ni

(10) Patent No.: US 9,954,359 B2
(45) Date of Patent: Apr. 24, 2018

(54) POWER SUPPLY CIRCUIT AND POWER SUPPLY METHOD

(71) Applicant: MEMBLAZE TECHNOLOGY (BEIJING) CO., LTD., Beijing (CN)

(72) Inventor: Yong Ni, Beijing (CN)

(73) Assignee: MEMBLAZE TECHNOLOGY (BEIJING) CO., LTD., Beijing (CN)

( * ) Notice: Subject to any disclaimer, the term of this patent is extended or adjusted under 35 U.S.C. 154(b) by 599 days.

(21) Appl. No.: 14/421,179

(22) PCT Filed: Jul. 26, 2013

(86) PCT No.: PCT/CN2013/080244
§ 371 (c)(1),
(2) Date: Jun. 12, 2015

(87) PCT Pub. No.: WO2014/015838
PCT Pub. Date: Jan. 30, 2014

(65) Prior Publication Data
US 2015/0318695 A1    Nov. 5, 2015

(30) Foreign Application Priority Data
Jul. 22, 2012 (CN) .......................... 2012 1 0258780

(51) Int. Cl.
*H02J 1/10* (2006.01)
*H02J 7/34* (2006.01)
*H02J 9/06* (2006.01)

(52) U.S. Cl.
CPC ............... *H02J 1/108* (2013.01); *H02J 7/34* (2013.01); *H02J 9/061* (2013.01); *Y10T 307/625* (2015.04)

(58) Field of Classification Search
None
See application file for complete search history.

(56) References Cited

U.S. PATENT DOCUMENTS

RE33,087 E * 10/1989 Bradford ................. G06F 1/189
                                                            307/64
8,031,551 B2  10/2011 Wilson
(Continued)

FOREIGN PATENT DOCUMENTS

CN        101102340 A      1/2008
CN        101441446 A      5/2009
(Continued)

OTHER PUBLICATIONS

International Search Report issued in PCT/CN2013/080244 dated Oct. 31, 2013 (4 pages).
(Continued)

*Primary Examiner* — Jared Fureman
*Assistant Examiner* — James Evans
(74) *Attorney, Agent, or Firm* — Osha Liang LLP

(57) ABSTRACT

A power supply circuit coupled to a power source for providing electronic energy to a workload includes a first switch, a control circuit, a first diode, and a backup power, in which the input of the first switch is coupled to the power source, the output of the first switch is coupled to the workload, the control circuit is coupled to the control terminal of the first switch for determining the state of the power source, the anode of the first diode is coupled to the power source, the cathode of the first diode is coupled to the first terminal of the backup power, the first terminal of the backup power is further coupled to the workload, when the control circuit determines that the power source is in a power-off state, a control signal is applied to the control terminal of the first switch to turn off the first switch.

14 Claims, 5 Drawing Sheets

(56) References Cited

U.S. PATENT DOCUMENTS

| | | | | |
|---|---|---|---|---|
| 2008/0150483 A1* | 6/2008 | Morita | ............... | H02J 9/061 320/122 |
| 2011/0260542 A1* | 10/2011 | Ge | ...................... | G06F 1/28 307/66 |
| 2012/0292984 A1* | 11/2012 | Iwagami | ............ | B60R 16/00 307/9.1 |
| 2013/0106180 A1* | 5/2013 | Akimasa | ........ | F02N 11/0814 307/9.1 |

FOREIGN PATENT DOCUMENTS

| | | | |
|---|---|---|---|
| CN | 101467212 | A | 6/2009 |
| CN | 101483480 | A | 7/2009 |
| CN | 101710252 | B | 1/2012 |
| CN | 102831920 | A | 12/2012 |

OTHER PUBLICATIONS

Written Opinion of the International Searching Authority issued in PCT/CN2013/080244 dated Oct. 31, 2013 (11 pages).

International Preliminary Report on Patentability from PCT/CN2013/080244 dated Jan. 27, 2015 (12 pages).

\* cited by examiner

POWER SUPPLY CIRCUIT AND POWER SUPPLY METHOD

TECHNICAL FIELD

This invention relates to a Solid-State Storage Device (SSD), particularly relates to a power supply circuit and a power supply method for a storage device.

BACKGROUND

Computer peripheral devices are connected to a computer via various interfaces. In most cases, computer interfaces provide not only a data path between a computer and peripheral devices, but also power from the computer to the peripheral devices. Therefore, in cases that the computer is powered off, the peripheral devices connected to the computer lose their power supply.

China patent CN101710252B discloses a solution of avoiding data loss in a buffer memory of a storage device in the case of an unexpected power-off. In this solution, a backup power is provided in the storage device. When an unexpected power-off occurs, the backup power provides temporary electricity to forward and store the data in the buffer memory (cache) to a flash memory. US patent U.S. Pat. No. 8,031,551B2 discloses a solution that a capacitor is used as the backup power of the storage device, and the performance of the capacitor is measured during runtime. If the charge quantity of the capacitor is too low, the capacitor is recharged.

China patent CN101483480A discloses that an alarm signal is generated to indicate the power-off when no voltage from a mainboard can be detected. China patent CN101467212A discloses that various working modes can be selected in a storage device according various sources of the power supply. As illustrated in FIG. 1, the storage means 200 includes power interfaces 230, 240, wherein the power interface 230 is connected to a power source 130 such as a battery, and the power interface 240 is connected to a power source 140 such as a computer. When a determining circuit 220 determines that the power is received from power source 230, the determining circuit 220 indicates NAND flash memory 210 works in a low-power mode, for the reason that the power source 130 is easily exhausted.

SUMMARY OF THE INVENTION

However, when a power source or power supply circuit of a computer or an information processing device is down, or a computer indicates a power-off event to peripheral devices, the power supplied to the peripheral devices is not stopped immediately. As there are power repository elements such as capacitors in circuits such as the power source or a mainboard, the power repository elements are able to provide electricity even after the power is off. However, in the prior art, this part of energy is ignored. According to the technical solution of this invention, the peripheral devices are able to detect the power-off state of the computer, and then utilize remaining power in the computer or the information processing device efficiently. Therefore, the working time of the peripheral devices are increased.

According to a first embodiment of the present invention, a power supply circuit is provided. The power supply circuit is coupled to a power source, and is used for providing electronic energy to a workload. The power supply circuit includes a first switch, a control circuit, and a first diode. The input of the first switch is coupled to the power source, the output of the first switch is coupled to the workload, and the control circuit is coupled to the control terminal of the first switch. The control circuit is used to determine the state of the power source. The anode of the first diode (114) is coupled to the power source, and the cathode of the first diode is coupled to the workload. When the control circuit determines the power source is in a power-down state, the control circuit applies a control signal to the control terminal of the first switch to turn-off the first switch.

According to the first embodiment of the present invention, a backup power is further included, wherein the first terminal of the backup power is coupled to the workload.

According to the first embodiment of the present invention, the second terminal of the backup power is coupled to the ground.

According to the first embodiment of the present invention, when the control circuit detects that the output voltage of the power source is less than a first threshold, it determines that the power source is in the power-down state.

According to the first embodiment of the present invention, when the control circuit receives a message indicating the power source is down, it determines that the power source is in the power-down state.

According to the first embodiment of the present invention, when the control circuit detects the output voltage of the power source is not less than a first threshold, it determines that the power source is not in the power-down state.

According to the first embodiment of the present invention, the control circuit is an ORing controller and the ORing controller is coupled to the output of the first switch.

According to the first embodiment of the present invention, when the control circuit determines the power source is not in the power-down state, a control signal is applied to the first switch to turn-on the first switch, and the on-state resistance of the first switch which is turned on, is less than the on-state resistance of the first diode (114).

According to the first embodiment of the present invention, it also includes a second diode (120), wherein the anode of the second diode (120) is coupled to the power source, and cathode of the second diode (120) is coupled to the workload. The on-state resistance of the first switch which is turned on is less than the on-state resistance of the second diode (120).

According to the third embodiment of the present invention, it also includes a second switch (122), wherein the input of the second switch (122) is coupled to the first terminal of the backup power, the output of the second switch (122) is coupled to the workload, and the control terminal of the second switch (122) is coupled to the control circuit. When the control circuit determines the power source is in the power-down state, the control circuit applies a control signal to the control terminal of the second switch (122) to turn-on the second switch (122).

According to a second embodiment of the present invention, a power supply method is provided. The power supply method is used for providing power from a power source to a workload. The method includes: determining the state of the power source; when the power is not in a power-down state, turning on the first switch to provide power from the power source to the workload via the first switch; when the power is in a power-down state, turning off the first switch and providing power from the power source to the workload via the first diode.

According to a second embodiment of the present invention, the method further includes when the output voltage of the power source is not less than a first threshold, determining the power source is not in the power-down state.

According to a second embodiment of the present invention, the method further includes when the output voltage of the power source is less than a first threshold, determining the power source is in the power-down state.

According to a second embodiment of the present invention, the method further includes when receiving a message indicating the power is down, determining the power source is in the power-down state.

According to a second embodiment of the present invention, the method further includes when the power source is in the power-down state, the backup power is providing power to the workload.

According to a second embodiment of the present invention, the method further includes when the power source is not in the power-down state, the power source is charging the backup power.

According to a second embodiment of the present invention, the method further includes when the power source is in the power-down state, further providing power from the power source to the workload via a second diode, wherein the anode of the second diode is coupled to the power source and the cathode of the second diode is coupled to the workload.

According to a second embodiment of the present invention, the method further includes when the power source is not in the power-down state, turning off the second switch, and when the power source is in the power-down state, turning on the second switch, wherein the input of the second switch is coupled to the cathode of the first diode and the output of the second switch is coupled to the workload.

According to a second embodiment of the present invention, the on-state resistance of the first diode and/or the second diode is bigger than the on-state resistance of the first switch which is turned on.

DESCRIPTION OF THE DRAWINGS

When reading along with the drawings, by reference to the detailed description of embodiments showed hereinafter, the present invention, as well as the preferred mode and its further purpose and advantages will be best understood, wherein the drawings include.

DETAILED DESCRIPTION

Figure 1:
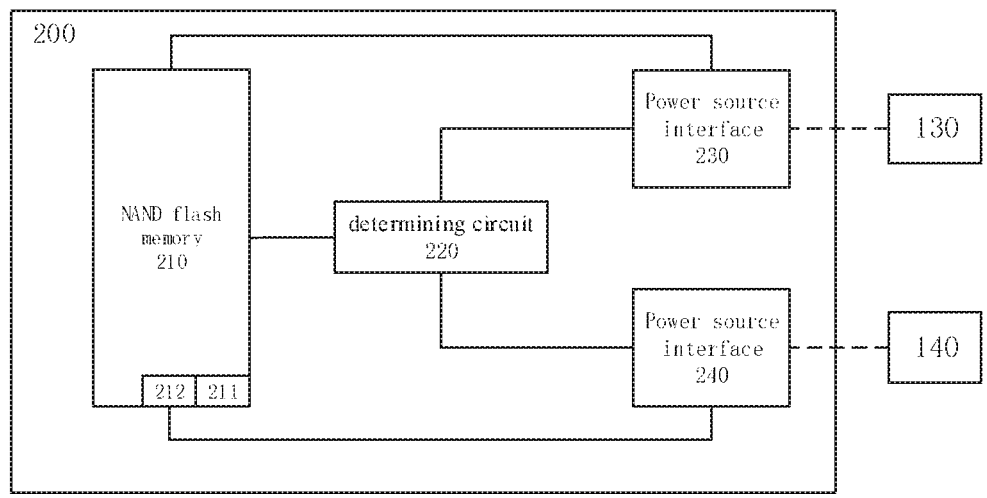
FIG. 1 is a block diagram of the storage device according to the prior art.
Figure 2:
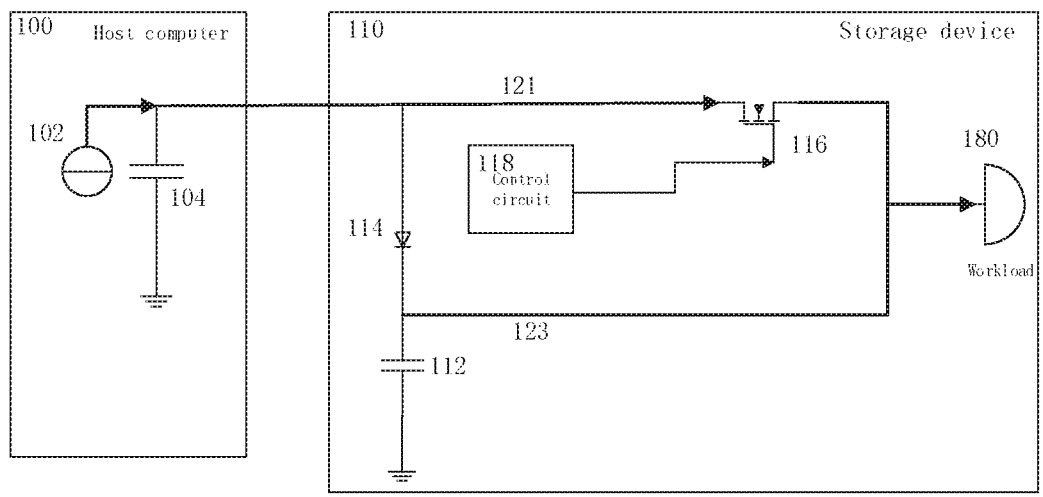
FIG. 2 is a schematic diagram of the power supply circuit of a peripheral device according a first embodiment of the present invention.

FIG. 2 is a schematic diagram of the power supply circuit of a peripheral device according to the first embodiment of the present invention. The embodiment illustrated in FIG. 2 includes a host computer 100 and a storage device 110 coupled to the host computer 100. The host computer 100 can be coupled to the storage device 110 in various ways.

The coupling ways used to connect the host computer 100 and the storage device 110 include but not limited to, e.g., SATA, IDE, USB, PCIE, SCSI, Ethernet, Fiber Channel and Wireless communication network. The host computer 100 is an information processing device, such as a personal computer, a tablet computer, a server, a portable computer, a network switch, a router, a cellular phone and a personal digital assistant (PDA), which can communicate with the storage device in one or more of the above discussed ways. The person skilled in the art can realize that other types of peripheral devices, such as network adapter or graphic adapter, can utilize the power supply circuit provided in the present invention.

The host computer 100 includes a power source 102 for providing electricity to various electronic components in the host computer and to the storage device 110 which is connected to the host computer. In the electronic components of the host computer 100, such as the power source or the mainboard, power repository elements such as capacitor 104 are further included. There may be one or more power repository elements in the host computer 100. The power repository element is illustrated as capacitor 104 for the purpose of clear expression. The capacitor 104 is coupled between the output of the power source 102 and the ground.

The power supply circuit of the storage device 110 receives electricity from the host computer, and provides the electricity to the workload 180. The workload 180 can be a flash memory and/or a memory control circuit in the storage device 110. The power supply circuit in the storage device 110 includes a capacitor 112, a diode 114, an N-channel MOSFET (metallic oxide semiconductor field effect transistor) 116, and a control circuit 118. The anode of the diode 114 is coupled to the output of the power source 102, the cathode of the diode 114 is coupled to one terminal of the capacitor 112, and the other terminal of the capacitor 112 is coupled to the ground. The capacitor 112 is used as the backup power of the storage device 110 to provide emergency power to the workload 180 of the storage device 110. The diode 114 and the capacitor 112 forms power supply path 123 to provide power to the workload 180 of the storage device 110. The source of the N-channel MOSFET 116 is coupled to the output of the power source 102, and the drain of the N-channel MOSFET 116 is coupled to the workload 180 to provide electricity to the workload 180. The control circuit 118 is coupled to the gate of the N-channel MOSFET 116 to control the N-channel MOSFET 116 to open or close. The N-channel MOSFET 116 works as a switch, and it forms the power supply path 121 to provide power to the workload 180. For example, the source of the N-channel MOSFET 116 works as the input of the switch, the drain of the N-channel MOSFET 116 works as the output of the switch, and the gate of the N-channel MOSFET 116 works as a control terminal to control the switch to open or close. The person skilled in the art can realize that, other types of switches can be used to form power supply path 121. The other types of switches include, but are not limited to, switches with PN junction such as a triode, or mechanical switches such as a relay. The control circuit 118 controls the N-channel MOSFET 116 to close or open according to the output voltage of the power source 102. When the power source 102 works normally, the output voltage of the power source 102 is higher or equal to a pre-determined voltage. The control circuit 118 measures the output voltage of the power source 102. If the measured output voltage is higher or equal to the pre-determined voltage, the control circuit 118 outputs a control signal to the N-channel MOSFET 116 to close the N-channel MOSFET 116. In this situation, the power from the power source 102 of the host computer 100 is fed to the workload 180 via the N-channel MOSFET 116. In a preferred embodiment, the diode 114 is selected such that the on-state resistance of the diode 114 is bigger than the on-state resistance of the N-channel MOSFET 116, and accordingly when the power source 102 works normally, power is supplied to the workload 180 via the power supply path 121, but not via the power supply path 123. Obviously, the N-channel MOSFET 116 can be selected such that the on-state resistance of the N-channel MOSFET 116 is less than the on-state resistance of the diode 114. The person skilled in the art will realize that, the diode 114 and the N-channel MOSFET 116 can be both in the on-state, such that power is provided to the workload 180 via power supply path 121 and power supply 123 simultaneously.

When the power is off, as there is the capacitor 104, the output voltage of the power source 102 will decrease gradually. When the output voltage of the power source 102 decreases to a value below a pre-determined voltage, which means the power of the host computer 100 is off, the power source 102 will not continue to provide power to the storage device 110 effectively. According to the detection, if the output voltage of the power source 102 is less than the pre-determined voltage, the control circuit 118 will output a control signal to the N-channel MOSFET 116 to cut-off the N-channel MOSFET 116. Although the output voltage of the power source 102 is less than the pre-determined voltage, the output voltage can turn on the diode 114, accordingly the electricity saved in the capacitor 104 can be provided to the workload 180 via the power supply path 123. At the same time, the capacitor 112 also provides power to the workload 180 and can make the voltage of the power supply path 123 stable.

In another embodiment, when the power of the host computer is down, or the power supply to the storage device 110 from the host computer 100 is stopped (e.g. for the reason of sleeping), the host computer 100 will send a message to the storage device 110 to indicate the power-off event occurs. Based on receiving and recognizing the power-off event, the control circuit 118 will output a control signal to the N-channel MOSFET 116 to turn-off the N channel MOSFET 116.

The person skilled in the art will realize that, the power source 102 can charge the capacitor 112. In an embodiment, the capacitor 112 is charged via the diode 114, and as the electronic quantity increases, so does the voltage of the cathode of the diode 114. When the voltage difference across the diode 114 is less than the turn-on voltage of the diode 114, the diode 114 is opened. The capacitor 112 can also be charged via the N-channel MOSFET 116.

The person skilled in the art can realize that, the capacitor 112 can be replaced with various batteries or various rechargeable batteries, or various batteries or various rechargeable batteries can be used as the backup power with the storage device 110 simultaneously. In an embodiment according to the present invention, there is no capacitor 112, and the power is provided to the storage device 110 only with the power source 102.

Figure 3:
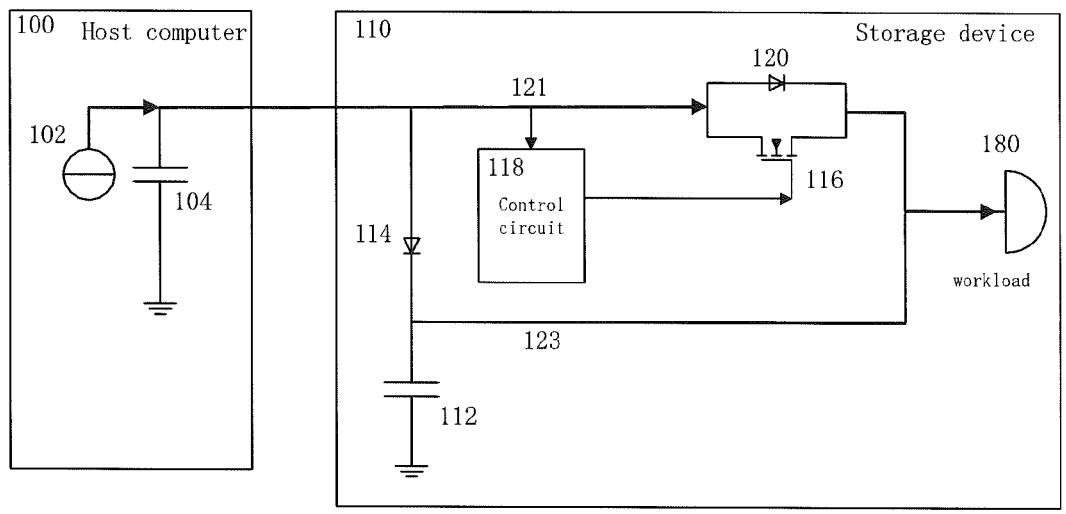
FIG. 3 is a schematic diagram of the power supply circuit of a peripheral device according a second embodiment of the present invention.

FIG. 3 is a schematic diagram of the power supply circuit of a peripheral device according a second embodiment of the present invention. The power supply circuit in the FIG. 3 is similar to the power supply circuit presented in FIG. 2. The difference is that there is a diode 120 in FIG. 3. The on-state resistance of the diode 120 is bigger than the on-state resistance of the N-channel MOSFET 116. Accordingly when the power source 102 works normally, the control circuit 118 controls the N-channel MOSFET 116 as a switch to turn-on, such that the electricity energy from the power source 102 is supplied to the workload 180 via the N-channel MOSFET 116. When the control circuit 118 measures the voltage of the power supply path 121 from the power source 102 and determines the power source 102 is off, the control circuit 118 output a control signal to turn-off the N-channel MOSFET 116. The output voltage of the power supply path 121 from the power source 102 can turn-on the diode 120, such that the electricity energy from the power source 102 is provided to the workload 180 via the diode 120. In another embodiment, when the power of the host computer 100 is down, or the power supply to the storage device 110 from the host computer 100 is stopped (e.g. for the reason of sleeping), the host computer 100 will send a message to the storage device 110 to indicate the power-off event occurs. Based on receiving and recognizing the power-off event from the host computer 100, the control circuit 118 will output a control signal to cut-off the N-channel MOSFET 116.

Figure 4:
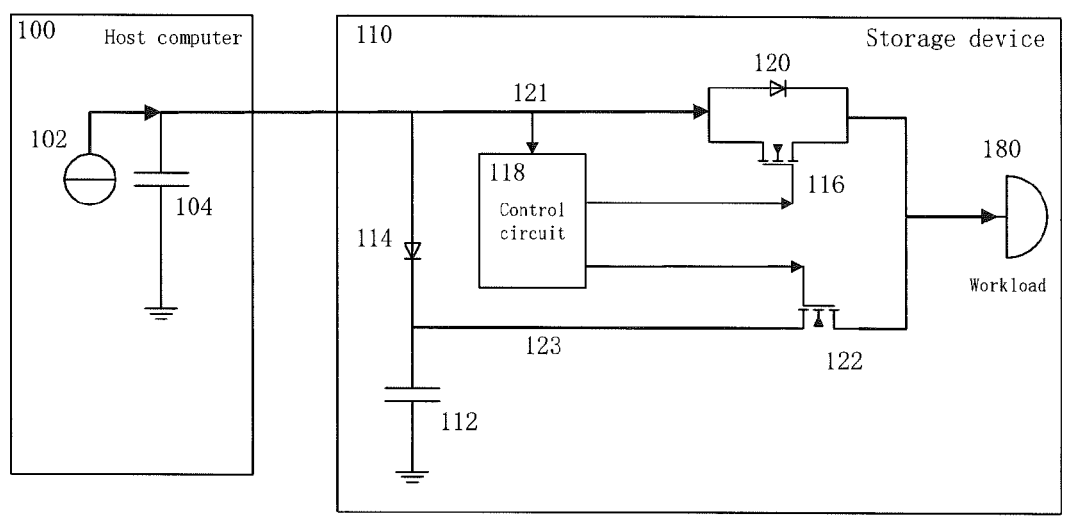
FIG. 4 is a schematic diagram of the power supply circuit of a peripheral device according a third embodiment of the present invention.

FIG. 4 is a schematic diagram of the power supply circuit of a peripheral device according a third embodiment of the present invention. The power supply circuit in the FIG. 4 is similar to the power supply circuit presented in FIG. 3. The difference is that there is an N-channel MOSFET 122 in FIG. 4. When the control circuit 118 determines the power source 102 works normally by measuring the output voltage of the power supply path 121 from the power source 102, the control circuit 118 turns on the N-channel MOSFET 116 (as a switch) and outputs a control signal to turn-off the N-channel MOSFET 122 (as a switch), such that the electricity energy from the power source 102 is provided to the workload 180 via the N-channel MOSFET 116. When the control circuit 118 determines the power source 102 is down by measuring the output voltage of the power supply path 121 from the power source 102, the control circuit 118 outputs a control signal to turn-off the N-channel MOSFET 116, and outputs a control signal to turn-on the N-channel MOSFET 122 (as a switch). Accordingly the electricity energy from the power source 102 is provided to the workload 180 via the diode 114 and the N-channel MOSFET 122 (as a switch). The electricity energy from the power source 102 can also be provided to the workload 180 via the diode 120. The person skilled in the art can also realize that, the diode 120 may be not used in the power supply circuit provided in FIG. 4. The N-channel MOSFET 122 can be replaced with other types of switches. The other types of switches include but are not limited to switches with PN junction such as a P-channel MOSFET or a triode, or mechanical switches such as a relay.

FIGS. 5A, 5B, 5C, 5D and 5E show embodiments of a control circuit of the power supply circuit of the present invention respectively.

Figure 5A:
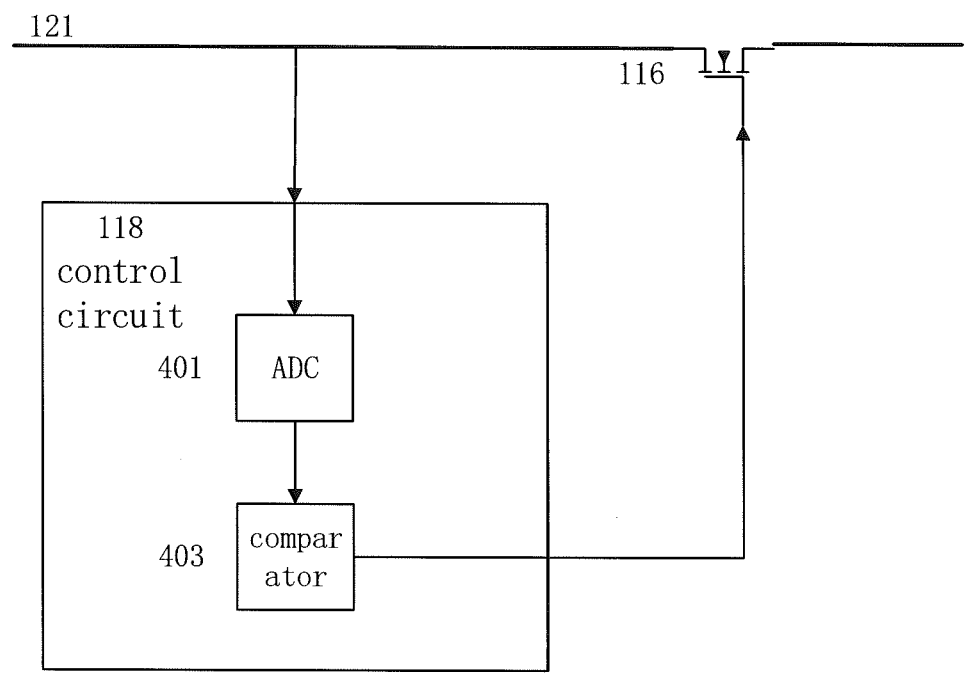
FIGS. 5A, 5B, 5C, 5D and 5E show embodiments of a control circuit of the power supply circuit of the present invention.

Referring to FIG. 5A, the control circuit 118 includes an ADC (analog-digital converter) 401 and a digital comparator 403. The ADC 401 converts the analog output voltage of the power supply path 121 from the power source 102 to a digital value indicating the output voltage of the power source 102. The digital comparator 403 compares the digital value output from the ADC 401 to a pre-determined digital value. When the digital value output from the ADC 401 is bigger or equal to the pre-determined digital value, the digital comparator 403 outputs a control signal to turn-on the N-channel MOSFET 116. When the digital value output from the ADC 401 is less than the pre-determined digital value, the digital comparator 403 outputs a control signal to turn-off the N-channel MOSFET 116. Based on similar principle, the comparator 403 can provide a control signal to the N-channel MOSFET 122 in FIG. 4.

Figure 5B:
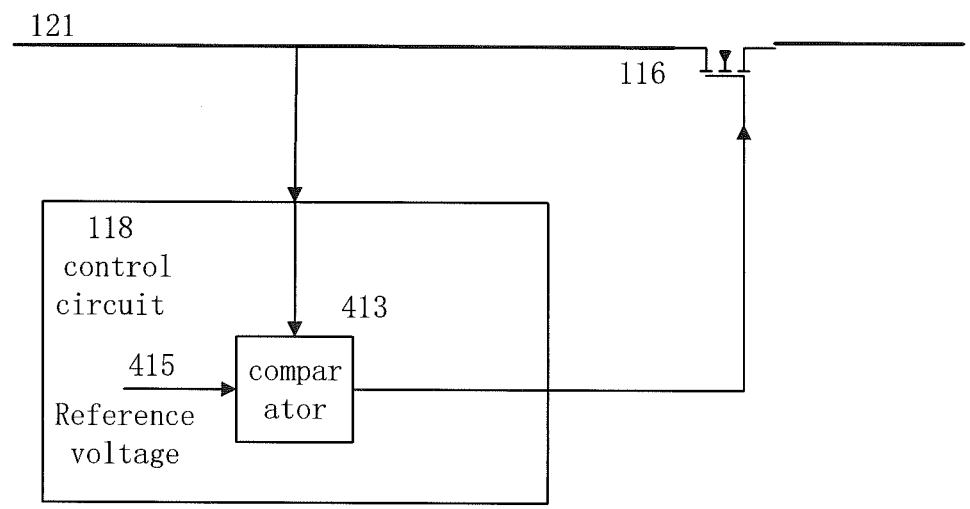

Referring to FIG. 5B, the control circuit 118 of another embodiment according to the present invention is provided. The control circuit 118 in FIG. 5B includes a comparator 413. The comparator 413 is an analog comparator, and receives the output voltage of the power supply path 121 from the power source 102 and a reference voltage 415. The reference voltage 415 indicates the output voltage when the power source 102 works normally. When the output voltage of the power source 102 is bigger than or equal to the reference voltage 415, the comparator 413 outputs a control signal to the N-channel MOSFET 116 to turn-on the N-channel MOSFET 116. When the output voltage of the power source 102 is less than the reference voltage 415, the comparator 413 outputs a control signal to the N-channel MOSFET 116 to turn-off the N-channel MOSFET 116. Based on similar principle, the comparator 413 can provide a control signal to the N-channel MOSFET 122 in FIG. 4.

Figure 5C:
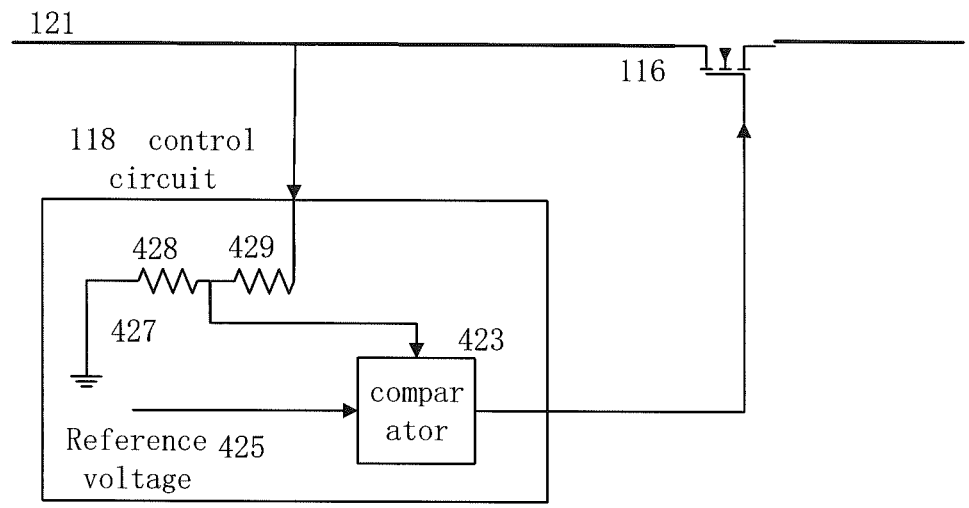

Referring to FIG. 5C, the control circuit 118 of another embodiment according the present invention is provided. The output voltage of the power source 102 may be a high voltage value, but it is not convenient to provide a higher reference voltage in the storage device 110. The control circuit 118 in FIG. 5C includes a comparator 423 and a voltage division circuit including resistance 428 and resistance 429. The resistance 428 and resistance 429 are connected serially. One terminal of the resistance 429 is coupled to the power supply path 121 and receives the output voltage from the power source 102. The other terminal of the resistance 429 is coupled to one terminal of the resistance 428, and the other terminal of the resistance 428 is coupled to a reference voltage (such as ground). The divided voltage output of the output voltage of the power source 102 is provided from the terminals of the resistance 428 and resistance 429 coupled with each other. The divided voltage output is coupled to the comparator 423. The other input terminal of the comparator 423 receives the reference voltage 425. When the power source 102 works normally, the divided voltage output is bigger than or equal to the reference voltage 425. Accordingly the comparator 423 outputs a control signal to the N-channel MOSFET 116 to turn-on the N-channel MOSFET 116. When the power source 102 is down, the divided voltage output is less than the reference voltage 425. Accordingly the comparator 423 outputs a control signal to the N-channel MOSFET 116 to turn-off the N-channel MOSFET 116. Based on similar principle, the comparator 423 can provide a control signal to the N-channel MOSFET 122 in FIG. 4.

Figure 5D:
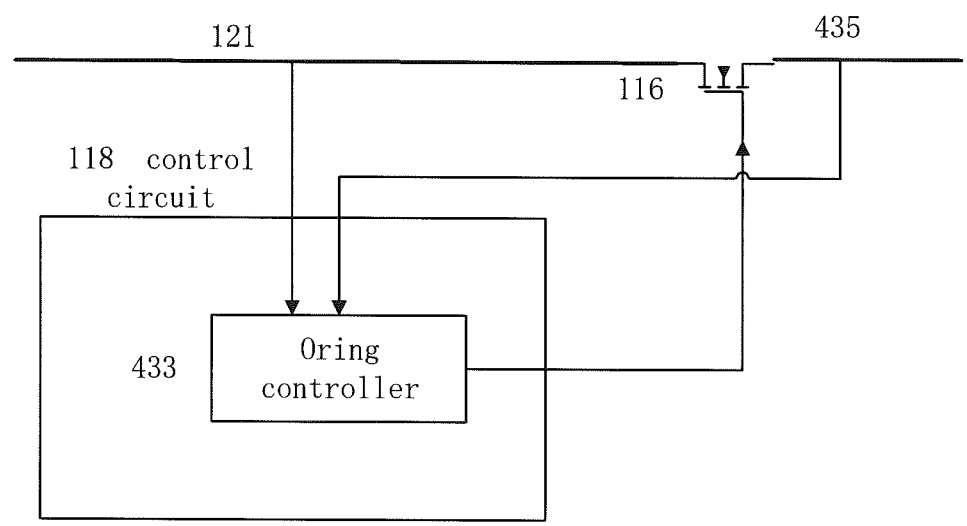

Referring to FIG. 5D, the control circuit 118 of another embodiment according to the present invention is provided. In FIG. 5D, the control circuit 118 includes an ORing controller 433. The input of the ORing controller 433 is coupled to the output of the power source 102 on the power source 102 and the output (drain) 435 of the N-channel MOSFET 116. The output of the Oring controller 433 is coupled to the gate of the N-channel MOSFET 116 to control the N-channel MOSFET 116 to turn-on or turn-off. When the voltage difference between the output voltage of the power source 102 on the power supply path 121 and the voltage of the output 435 of the N-channel MOSFET 116 is bigger than or equal to a pre-determined value, the Oring controller 433 controls the output of the N-channel MOSFET 116 to turn-on. When the voltage difference between the output voltage of the power source 102 on the power supply path 121 and the voltage of the output 435 of the N-channel MOSFET 116 is less than the pre-determined value, the ORing controller 433 controls the output of the N-channel MOSFET 116 to turn-off. The ORing controller 433 may be the ORing controller from TI (Texas Instruments Incorporated) company with the type TPS2419. Based on similar principle, the ORing controller 433 can provide a control signal to the N-channel MOSFET 122 in FIG. 4.

Figure 5E:
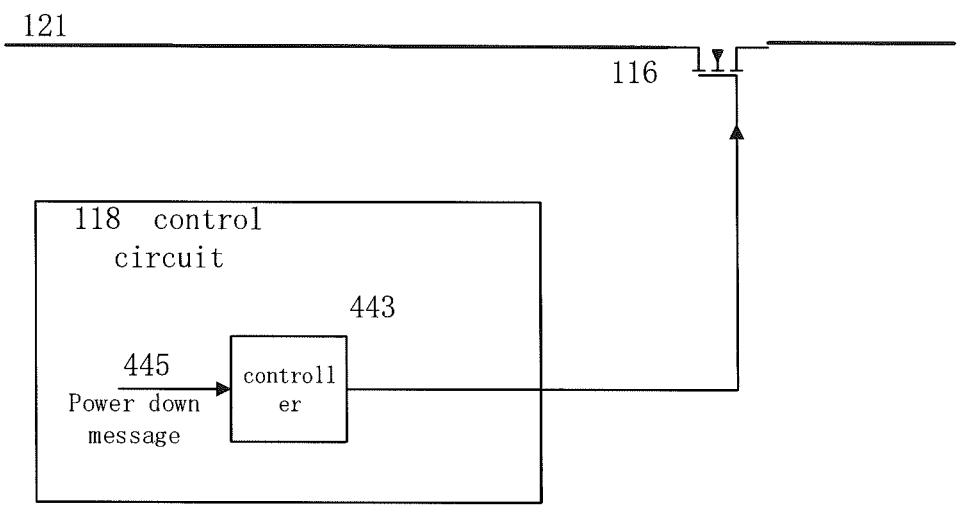

Referring to FIG. 5E, the control circuit 118 of another embodiment according to the present invention is provided. In FIG. 5E, the control circuit 118 includes a controller 443. The controller 433 receives and recognizes messages indicating power is down, sent by the host computer. When no messages indicating the power is down is received, the controller 433 provides a control signal to the N-channel MOSFET 116 to turn-on the N-channel MOSFET 116. When the message indicating the power is down is received, the controller 433 provides a control signal to the N-channel MOSFET 116 to turn-off the N-channel MOSFET 116. The controller 433 can be implemented in the interface controller used for communicating with the host computer 100 in the storage device 110. According to the type of the interface, the interface controller can be a SATA (Serial Advanced Technology Attachment) controller, a USB (Universal Serial Bus) controller, a PCI (Peripheral Component Interconnect) controller, a PCIE (Peripheral Component Interconnect Express) controller, a SCSI (Small Computer System Interface) controller, an IDE (Integrated Drive Electronics) controller, and so on. Based on similar principle, the controller 443 can provide a control signal to the N-channel MOSFET 122 in FIG. 4.

This has shown the description of the present invention for the purpose of describing and presenting, but not limiting the invention to the disclosed form. Many adjustments and changes are obvious to persons skilled in the art.

What is claimed is:

1. A power supply circuit coupled to a power source, used for providing electronic energy to a workload, comprising a first switch, a control circuit, and a first diode, wherein
   the input of the first switch is coupled to the power source, the output of the first switch is coupled to the workload;
   the control circuit is coupled to the control terminal of the first switch and is used to determine the state of the power source;
   the anode of the first diode is coupled the power source, the cathode of the first diode is coupled to the workload;
   when the control circuit determines the power source is in a power-down state, the control circuit applies a control signal to the control terminal of the first switch to turn off the first switch,
   wherein the power supply circuit further includes a second diode and a backup power, wherein the anode of the second diode is coupled to the power source, the cathode of the second diode is coupled to the workload, the on-state resistance of the first switch which is turned on is less than the on-state resistance of the second diode; and the first terminal of the backup power is coupled to the workload.

2. The power supply circuit according to claim 1, further includes a second switch, wherein the input of the second switch is coupled to the first terminal of the backup power, the output of the second switch is coupled to the workload, the control terminal of the second switch is coupled to the control circuit, and when the control circuit turns off the first switch, the control circuit also applies a control signal to the control terminal of the second switch to turn on the second switch.

3. The power supply circuit according to claim 1, wherein when the control circuit detects that the output voltage of the power source is less than a first threshold value, that the power source is in power-down state is determined.

4. A power supply circuit coupled to a power source, used for providing electronic energy to a workload, comprising a first switch, a control circuit, and a first diode, wherein
the input of the first switch is coupled to the power source, the output of the first switch is coupled to the workload;
the control circuit is coupled to the control terminal of the first switch and is used to determine the state of the power source;
the anode of the first diode is coupled to the power source, the cathode of the first diode is coupled to the workload;
when the control circuit determines the power source is in a power-down state, the control circuit applies a control signal to the control terminal of the first switch to turn off the first switch,
wherein when the control circuit determines the power source is not in a power-down state, the control circuit applies to the first switch a control signal to turn on the first switch, and the on-state resistance of the first switch which is turned on is less than the on-state resistance of the first diode.

5. The power supply circuit according to claim 4, further includes a second diode and a backup power, wherein the anode of the second diode is coupled to the power source, the cathode of the second diode is coupled to the workload, the on-state resistance of the first switch which is turned on is less than the on-state resistance of the second diode; and the first terminal of the backup power is coupled to the workload.

6. The power supply circuit according to claim 4, further includes a second switch, wherein the input of the second switch is coupled to the first terminal of a backup power, the output of the second switch is coupled to the workload, the control terminal of the second switch is coupled to the control circuit, and when the control circuit turns off the first switch, the control circuit also applies a control signal to the control terminal of the second switch to turn on the second switch.

7. The power supply circuit according to claim 5, further includes a second switch, wherein the input of the second switch is coupled to the first terminal of the backup power, the output of the second switch is coupled to the workload, the control terminal of the second switch is coupled to the control circuit, and when the control circuit turns off the first switch, the control circuit also applies a control signal to the control terminal of the second switch to turn on the second switch.

8. A power supply method, used for providing power from a power source to a workload, includes:
determining the state of the power source;
when the power is not in a power-down state, turning on a first switch to provide power from the power source to the workload via the first switch;
when the power is in a power-down state, turning off the first switch and providing power from the power source to the workload via a first diode,
wherein when the power is in the power-down state, further providing power from the power source to the workload via a second diode, and wherein the anode of the second diode is coupled to the power source and the cathode of the second diode is coupled to the workload.

9. The power supply method according to claim 8, further includes when the power is in the power-down state, providing power from a backup power to the workload.

10. The power supply method according to claim 8, wherein when the power is not in the power-down state, the second switch is turned off, the input of the second switch is coupled to the cathode of the first diode and the output of the second switch is coupled to the workload, and when the power is in the power-down state, a second switch is turned on.

11. The power supply method according to claim 8, wherein the on-state resistance of the first diode and/or the second diode is bigger than the on-state resistance of the first switch which is turned on.

12. The power supply method according to claim 9, wherein when the power is not in the power-down state, a second switch is turned off, the input of the second switch is coupled to the cathode of the first diode and the output of the second switch is coupled to the workload, and when the power is in the power-down state, the second switch is turned on.

13. The power supply method according to claim 9, wherein the on-state resistance of the first diode and the second diode is bigger than the on-state resistance of the first switch which is turned on.

14. The power supply method according to claim 10, wherein the on-state resistance of the first diode and the second diode is bigger than the on-state resistance of the first switch which is turned on.

\* \* \* \* \*